(12) United States Patent
Johnson

(10) Patent No.: US 6,173,523 B1
(45) Date of Patent: Jan. 16, 2001

(54) SONIC PLASTIC BAIT

(76) Inventor: Michael E. Johnson, 14848 Wood Dr., Magalia, CA (US) 95954

( * ) Notice: Under 35 U.S.C. 154(b), the term of this patent shall be extended for 0 days.

(21) Appl. No.: 09/353,378

(22) Filed: Jul. 15, 1999

(51) Int. Cl.$^7$ .................................................. A01K 85/00
(52) U.S. Cl. .......................... 43/42.24; 43/42.26; 43/42.3
(58) Field of Search .............................. 43/42.24, 42.26, 43/42.27, 42.28, 42.3, 42.31

(56) References Cited

U.S. PATENT DOCUMENTS

| | | | |
|---|---|---|---|
| 208,581 | * | 10/1878 | Falvey ................................... 43/42.26 |
| D. 231,453 | * | 4/1974 | Haggard ................................ 43/42.26 |
| 1,247,955 | * | 11/1917 | Grube ................................... 43/42.26 |
| 2,290,433 | * | 7/1942 | Jeffers .................................. 43/42.26 |
| 2,492,064 | * | 12/1949 | Rauh .................................... 43/42.28 |
| 2,718,668 | * | 9/1955 | Burke ................................... 43/42.24 |
| 4,069,610 | * | 1/1978 | Firmin ................................... 43/42.24 |
| 4,709,501 | * | 12/1987 | Garst .................................... 43/42.24 |
| 4,914,850 | * | 4/1990 | Rice ..................................... 43/42.24 |
| 5,228,230 | * | 7/1993 | Vaught .................................. 43/42.26 |
| 5,353,540 | * | 10/1994 | Ward .................................... 43/42.24 |
| 5,408,780 | * | 4/1995 | Chambers, Sr. ....................... 43/42.24 |
| 5,438,790 | * | 8/1995 | Rigney .................................. 43/42.24 |
| 5,640,798 | * | 6/1997 | Garst .................................... 43/42.24 |
| 5,934,008 | * | 8/1999 | Rice ..................................... 43/42.26 |

* cited by examiner

Primary Examiner—Darren W. Ark

(57) ABSTRACT

A sonic plastic bait has an elongated cylindrical body. Ventral fins are longitudinally aligned in an oblong design along the lower edges of the bait body as a continuation of a belly portion. The belly portion and the fins form the continuous flat underside surface of the sonic bait. The upper part of the body has a rounded back raised above where the ventral fins protrude along the sides. At a front end, the bait body is shaped head-like. Towards the rear end, the bait body slants downward to a size approximately aligned with the ventral fin thickness and forms into a split tail section resembling flukes. The ventral fins are sectioned into individual appendages that vibrate or touch each other and produce a low sound attractive to fish when the sonic plastic bait is pulled through water.

5 Claims, 2 Drawing Sheets

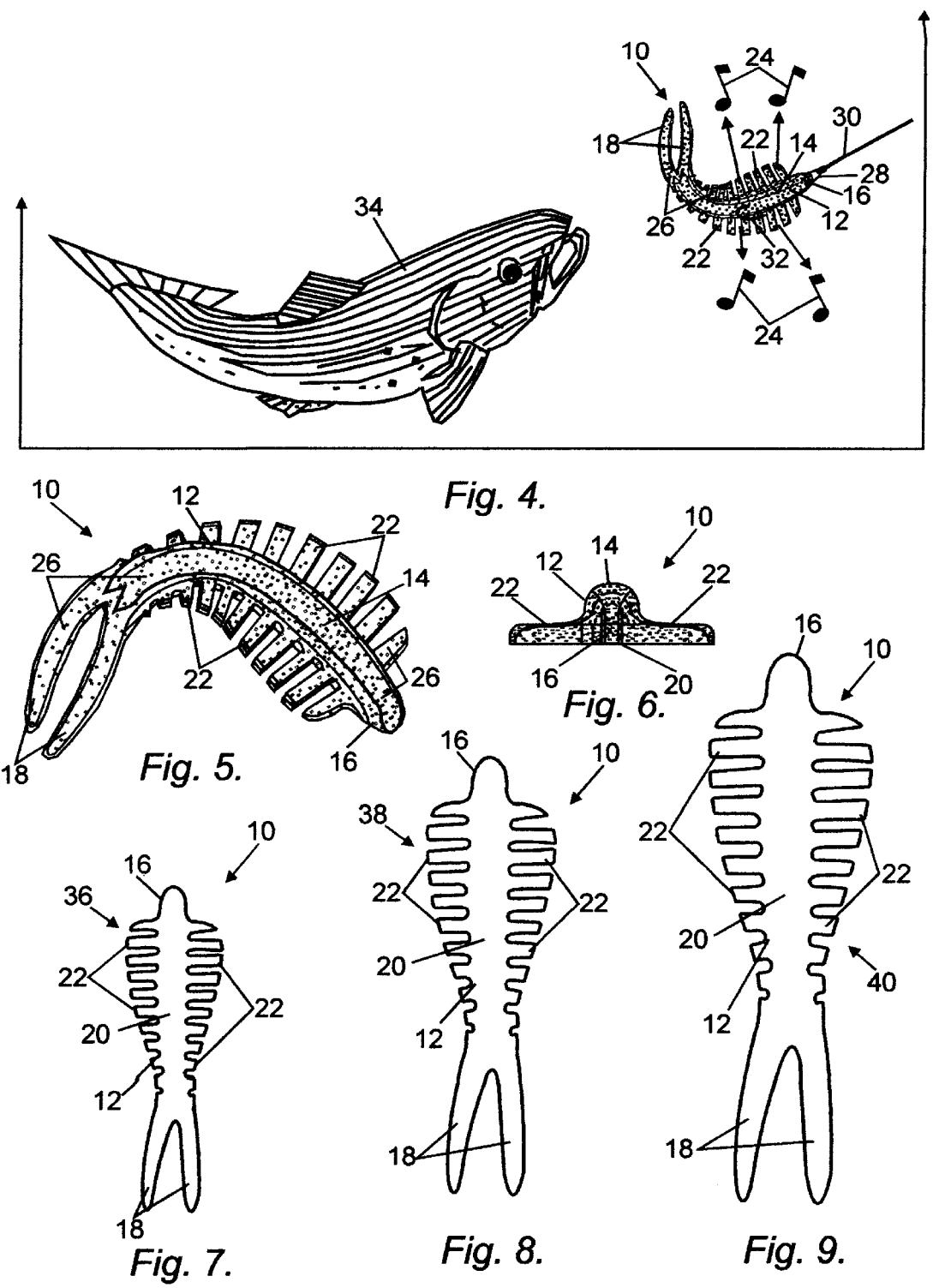

SONIC PLASTIC BAIT

BACKGROUND OF THE INVENTION

This invention relates to artificial fishing baits with the present invention particularly directed towards a realistic aquatic animal of pliable plastic structure having movement and sonic capabilities.

It has long been known that fish are attracted to fishing baits by the natural appearance of the bait, by its movement, and by any sound it could make. Therefore, live bait, minnows, worms, frogs, grasshoppers, and others that could wiggle when hooked to the end of a fisherman's line were usually the baits of choice. However, the emergent of soft plastic lures shaped in forms representative of aquatic animals eliminates the need for securing and maintaining live bait. From worms to lizards, soft plastic baits were produced. The only problem with soft plastic baits was to create a single design useful in a variety of fishing situations and one that could generate sounds.

BRIEF SUMMARY OF THE INVENTION

Therefore, in practicing the invention, a sonic plastic bait is provided in a universal design that appears to swims when moved in water and produces a sound attractive to fish. The bait of the present invention has an elongated cylindrical body with ventral fins radiating outward aligned longitudinally along a lower portion on both sides of the body. The ventral fins form an oblong pattern along the lower edges of the bait body as a continuation of a flat belly. The flat belly and the flat undersurfaces of the ventral fins give the sonic plastic bait of this invention a flat continuous underside surface. The oblong outline formed by the ventral fins provides the bait with an aquatic-like species silhouette attractive to fish. The upper part of the body has a rounded back raised above where the ventral fins protrude along the sides. At a front end, the bait body is shaped head-like. Towards the rear end, the bait body slants downward to a size approximately aligned with the ventral fin thickness and forms into a split tail section resembling flukes. The split tail section extends out behind the bait body to a length of approximately half the body length. The split tail section is V-shaped with rounded outer edges that curve into almost pointed terminal ends. The material of manufacture used in the present invention is a rubbery, pliable plastic that produces a near facsimile of a wiggly, aquatic species. The end product of the invention can be supplied clear (uncolored) or in a multiple of colors and colored flake-implanted forms. Different sizes of the same bait can be used in a variety of fishing situations.

A principal object of the present invention is to a provide a sonic plastic bait for fishing as a replacement for live bait, the sonic plastic bait resembling a wiggly, aquatic species and producing a low sound attractive to fish when the bait is passed through water.

Another object of my invention is to provide a sonic plastic fishing bait in a universal design so a single bait type can be used in a multiple of fishing environments.

A further object of the invention is to provide an artificial fishing bait with split ventral fins that make a low swimming sound attractive to fish rather than frightening to them when the bait is moved through water.

Other objects and the many advantages of the present invention will be better understood by reading the following specifications and comparing numbered parts described with like numbered parts illustrated in the drawings.

BRIEF DESCRIPTION OF THE SEVERAL VIEWS OF THE DRAWINGS

In the drawings:

FIG. 4 shows the sonic plastic bait of this invention in a reduced drawing affixed with hook and line being pulled through water causing swim-like movements and attracting an illustrative fish by sight and sound.

FIG. 5 shows a reversed enlargement of the FIG. 4-bait drawing without hook and line.

FIG. 6 shows the sonic plastic bait of this invention in a frontal view sized in accordance with the FIG. 1 drawing.

FIG. 7 shows the sonic plastic bait of this invention uncolored in a bottom plan view illustrating variations in bait sizing, the drawing not to scale but representative of the sonic plastic bait of the invention at 70% of normal size.

FIG. 8 showing the sonic plastic bait of this invention uncolored in a bottom plan view not to scale but representative of the normal size of approximately four and three quarters inch in length and one and three eight inch in width.

FIG. 9 shows the sonic plastic bait of this invention uncolored in a size representing 120% of normal.

DETAILED DESCRIPTION OF THE INVENTION

Figure 1:
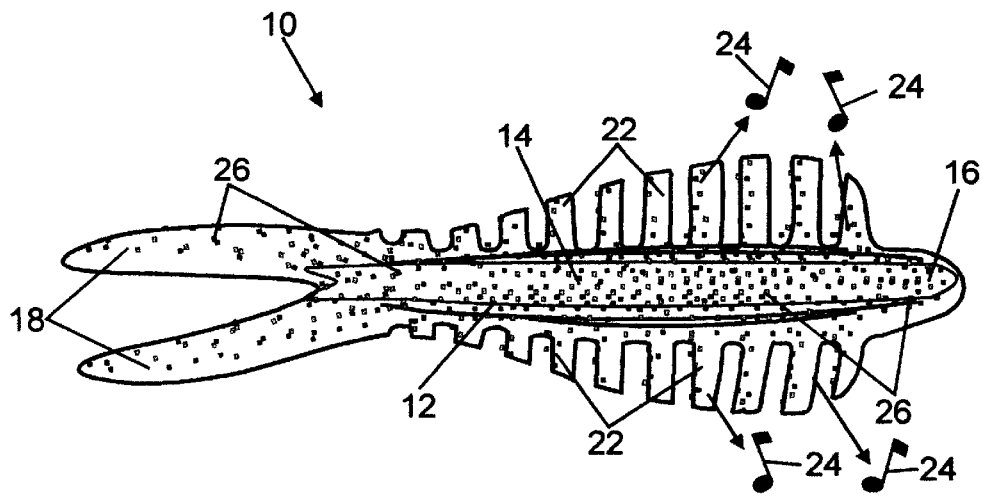
FIG. 1 shows a top plan view of a sonic plastic bait for fishing that resembles a wiggly, aquatic species according to the present invention.

Referring now to the drawing figures where the sonic plastic bait in general is designated invention 10. In FIG. 1, invention 10, shown in a top plan view, has an elongated cylindrical body 12. An upper rounded portion of body 12 is back 14. At a front end, body 12 is shaped into head 16. At a rear end, body 12 contours downward forming into flattened split tail 18. Flattened split tail 18 extends out behind body 12 to a length approximately half the length of body 12. Split tail 18 divides into two substantially flattened sections forming a V-shape with rounded outer edges converging to almost pointed terminal ends. Material used to manufacture invention 10 is a rubbery, pliable plastic that produces a near facsimile of a wiggly, aquatic species.

Figure 2:
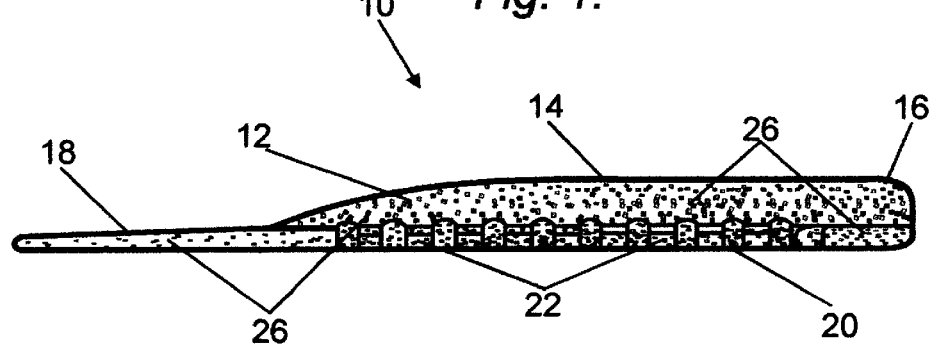
FIG. 2 shows the sonic plastic bait of FIG. 1 in a side elevation view.
Figure 3:
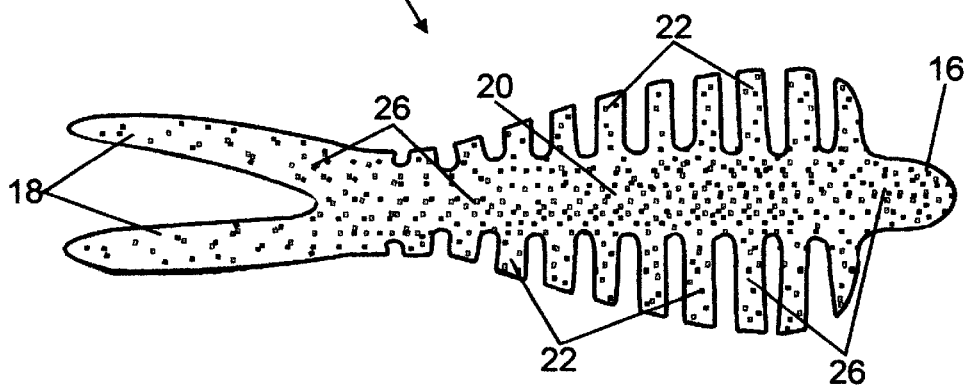
FIG. 3 shows the flat bottom side of a sonic plastic bait in accordance with the present invention.

In FIGS. 2 and 3, it can be seen that body 12 has a flat underside designated belly 20. Longitudinally aligned ventral fins 22 radiate outward elliptically along the lower edge of body 12 on both sides. Belly 20 and ventral fins 22 form a continuous flat underside surface unique to invention 10. Ventral fins 22 are sectioned into individual appendages that vibrate or touch each other and produce a low sound 24 (FIGS. 1 and 4) when invention 10 is pulled through water. Wiggling movement and sound 24 as illustrated in FIG. 4 is devised to attract illustrative fish 34 to invention 10. In FIG. 4, a fishhook 32 through body 12 holds the bait of invention 10 to fisherman's leader 30 attached to swivel loop 28. FIG. 5 shows a reversed enlargement of the FIG. 4 bait without fishhook 32 attaching invention 10 to leader 30 at swivel 28. Also In FIG. 5, the wiggly-swimming action of invention 10 and aquatic coloring 26 by colored flakes in the material of manufacture is illustrated.

Rounded back 14 rising above where ventral fins 22 protrude along the sides of body 12 can be seen in the frontal view of invention 10 at FIG. 6. The flat underside surface of invention 10, a continuation of flat belly 20 and the flat undersides of ventral fins 22, provides an excellent silhouette of an aquatic species to a fish 34 that might be swimming under invention 10. The attraction of invention 10 is further enhanced by colored flakes as aquatic coloring 26 seen through the clear rubbery plastic material of invention 10. Aquatic coloring 26 in the form of colored flakes is shown in FIGS. 1–6. FIGS. 7, 8, and 9 are not to scale but are bottom plan views of invention 10 clear showing three different end product sizes. FIG. 7 illustrates small bait size 34 at 70% of the normal bait size. FIG. 8 represents the normal 100% bait size 38, approximately four and three quarters inch long and one and three eight inch wide. FIG. 9 is production bait size 40, 120% of normal. These are the sizes of invention 10 considered most useful for a variety of fishing situations. The three production sizes allow invention 10, as a universal bait, to be used in a variety of fishing environments.

Although I have described my invention with considerable details in the foregoing specification and illustrated it extensively in the drawings, it is to be understood that I may make changes in the structure of the device so long as any changes made remain within the scope of the appended claims and any changed devices similar to mine made by others that fall within my claim scope, I shall consider such devices to be my invention.

What is claimed is:

1. A sonic plastic bait which is an artificial replacement for live fishing bait, said sonic plastic bait comprising:

an elongated, cylindrical body extending along a longitudinal axis and having a front, rear, top, and bottom, the top of the body extending upwardly and being curved, the bottom of the body being flat, the rear of the body being tapered;

a flattened split tail extends rearwardly from the rear of the body and has a length which is approximately half of the length of the body;

a plurality of separate appendages spaced along the body which extend outwardly from the body on opposite sides of the body in a direction which is generally perpendicular to the longitudinal axis, the appendages forming an oblong pattern when viewed from above, each of said appendages having a flat undersurface which is coplanar with the bottom of the body;

a first pair of appendages of the plurality of appendages which are closest to the front of the body each have a curved forward edge which curves outwardly and then rearwardly from the front of the body and a straight rearward edge, both edges terminating at a free end of the appendage;

said sonic plastic bait is made of a rubbery plastic; and wherein said appendages produce low sound emissions by vibrating and by rubbing each other when the sonic plastic bait is pulled through water.

2. The sonic plastic bait of claim 1 wherein said sonic plastic bait is made of a clear rubbery plastic.

3. The sonic plastic bait of claim 1 wherein said sonic plastic bait can be made in a variety of colors.

4. The sonic plastic bait of claim 1 wherein said sonic plastic bait is impregnated with colored flakes.

5. The sonic plastic bait of claim 1 wherein said sonic plastic bait can be made in different sizes.

* * * * *